May 16, 1950     E. H. BENSON     2,507,752
BUNG FORMING STRUCTURE FOR BARRELS
Filed Sept. 30, 1946     2 Sheets—Sheet 1

Inventor
Ernest H. Benson
By
Attorney

May 16, 1950     E. H. BENSON     2,507,752
BUNG FORMING STRUCTURE FOR BARRELS
Filed Sept. 30, 1946     2 Sheets-Sheet 2
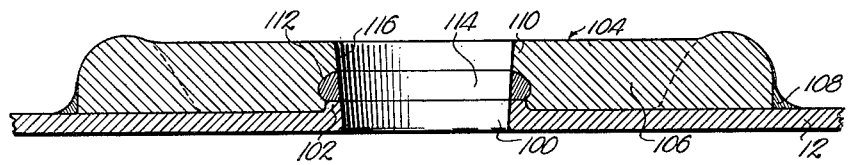
Fig. 4.
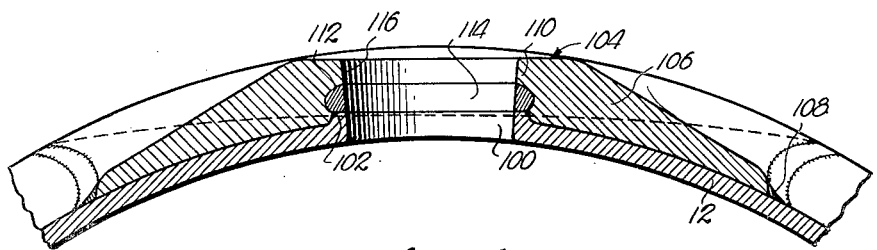
Fig. 5.
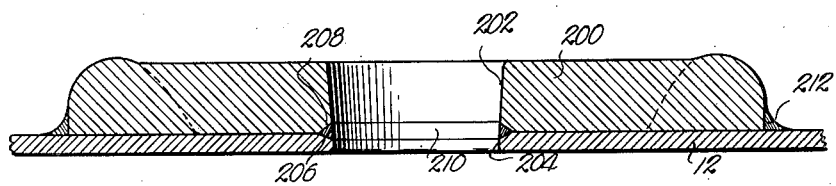
Fig. 6.
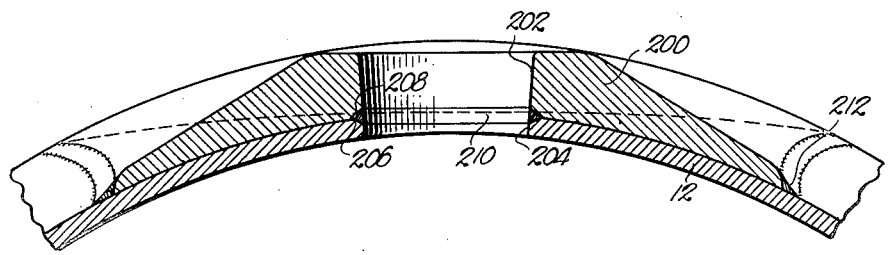
Fig. 7.
Inventor
Ernest H. Benson
By 
Attorney Patented May 16, 1950

2,507,752

UNITED STATES PATENT OFFICE 2,507,752

BUNG FORMING STRUCTURE FOR BARRELS

Ernest H. Benson, Kansas City, Mo.

Application September 30, 1946, Serial No. 700,287

3 Claims. (Cl. 285—49)

This invention relates to the art of producing barrels, casks or other similar types of containers where a filler opening is required through the side thereof and in which opening a plug or stopper is employed while the filled barrel is being transported.

The primary aim of the invention is to provide novel, unique, strong and inexpensively produced structure for forming the bung or filler opening in the barrel or the like, which structure comprises an arrangement of parts applicable without penetrating the side wall of the barrel and without presenting "breaks" or uneven surfaces that may prove objectionable in sealing the filler opening by the application thereinto of a plug or the like.

A further aim of this invention is to provide bung structure for barrels which includes a reinforcing block formed to cooperate with the filler opening provided in the side wall of the barrel and contoured to complement the outer surface of the barrel side and to be held in position by welding at the periphery of the block as well as at the zone of interconnection between the block and its hole which is held in register with the opening in the side of the barrel to form the complete filler opening.

Further aims of the invention are to provide unique ways of attaching the reinforcing block to the barrel where the filler opening is formed by the interassociation of the said block and side wall of the barrel and to provide grooves, cavities or angled surfaces in either or both of the block and barrel side wall for the reception of the weld seam.

Other aims of the invention will appear during the course of the following specification referring to the accompanying drawings, wherein.

Figure 2:
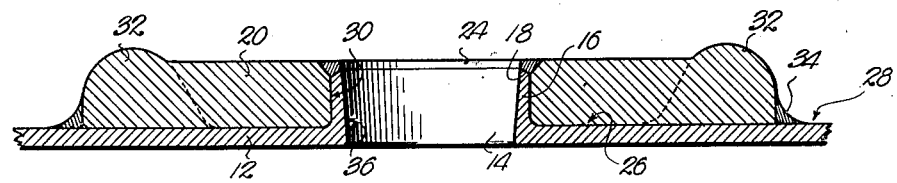
Fig. 2 is a fragmentary cross-sectional view taken on line II—II of Fig. 1.
Figure 3:
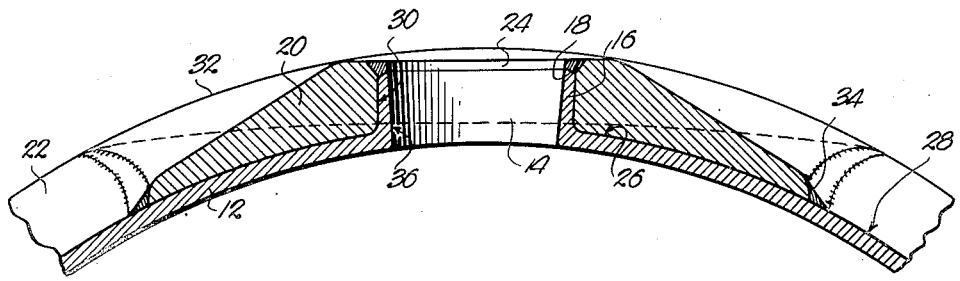
Fig. 3 is a fragmentary sectional view taken on line III—III of Fig. 1.

Figs. 4 and 5 are similar views respectively to Figs. 2 and 3 but illustrating a modified form of the invention; and Figs. 6 and 7 are similar sectional views respectively to Figs. 2 and 3 but illustrating a still further modification of the instant invention.

The art of producing barrels, casks or other hollow bodies from sheet metal is fast developing into an important business and the problem of producing a satisfactory filler opening that may be plugged or otherwise closed is now a troublesome one.

Figure 1:
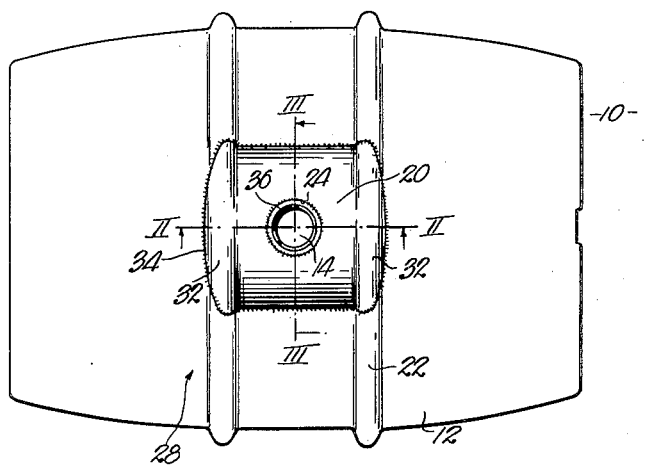
Fig. 1 is a side elevational view of a barrel showing the manner of applying a reinforcing block to establish a complete filler opening therefor.

The barrel body illustrated in Fig. 1 is generally designated by the numeral 10 and its annular side wall 12 is of the same contour and character throughout all of the Figs. 1 to 7 inclusive. In the form of the invention shown in Figs. 1 to 3, the barrel wall 12 has an opening 14 provided therein by not only piercing the wall 12 but by forming an out-turned flange 16 extending around the edge of wall 12 which forms this said opening 14. Flange 16 projects radially outwardly from body 10 of the barrel and has the free edge thereof inclined downwardly and outwardly as at 18 to cooperate with a portion of the reinforcing block 20 in a manner to be more fully hereinafter described.

The body of barrel 10 has a pair of spaced apart rolling rings 22 embossed outwardly at places shown in Fig. 1 and it is upon these rings 22 that barrel 10 is rolled when being handled.

The reinforcing block 20 is comparatively thick as regards the thickness of wall 12 and made of relatively strong material such as an alloy of aluminum or any other substance that will protect the wall 12 and prevent distortion thereof when a bung plug or the like (not here shown) is moved to place and driven into the filler opening which comprises the combined length of flange 16 and the weld seam 24 when the assembly is completed. The block 20 is slightly wider than the height of flange 16 and the inner surface 26 of block 20 is contoured to complement the contour of the outermost surface 28 of wall 12 forming a part of barrel 10.

Block 20 is positioned between rolling rings 22 but lies wholly below the outer periphery of these rolling rings as illustrated in Fig. 3 to prevent the block from striking the floor or the like over which the barrel is rolled. Block 20 extends outwardly from the filler opening which comprises not only the opening 14 through wall 12 but the hole 30 in block 20. Note that that portion of hole 30 above the outer end of flange 18 is inclined upwardly and outwardly and the angle of inclination combines with the angled outer end of flange 16 in presenting a groove for the reception of the weld seam 24.

Rolling rings 22 merge with wall 12 where block 20 is attached thereto and therefore, block 20 is molded or otherwise formed to present beads 32 in alignment with rings 22 to cooperate therewith in protecting the filler opening against damage. After the block 20 is fabricated and the barrel 10 is produced, the block is moved to position against the outer surface 26 of barrel body wall 12 and the weld seam 24 produced. The outer periphery of block 20 is welded directly to the wall 12 by a weld seam 34 and therefore, no openings or penetration of wall 12 is needed to hold the bung forming structure in place.

The relatively soft material from which the barrel is made when it is produced of aluminum sheets is protected and reinforced by block 20 and a bung of any form may be driven into the filler opening comprising opening 14 and hole 30. The outer surface of flange 16 is not inclined from the axis of the filler opening but the inner surface 36 of the filler opening is inclined outwardly to present a flared filler opening into which the bung or plug may be inserted.

In the form of the invention shown in Figs. 4 and 5, the barrel 10 and all its component parts with the exception of the flange around the opening is substantially the same as that illustrated in Figs. 1 to 3 inclusive and therefore, only the parts of the modified form of the invention which are different from those shown in the preferred embodiment, will be here specified and explained.

The barrel wall 12 has an opening 100 provided therein which is created by a relatively short out-turned flange 102 that terminates well below the outer surface 104 of the reinforcing block 106. The block 106 is contoured to the outer surface of wall 12 in the same manner as above set down and a weld seam 108 is established around the outer periphery of block 106 to hold the same in position. Block 106 has an overhanging lip 110 above and outwardly from the end of flange 102 to cooperate with said flange end in creating a groove 112. This groove is between the overhanging lip 110 and flange 112 and the weld seam 114 is located within this groove 112 when the parts are assembled. Block 106 has a hole 116 provided therein which registers with opening 100 and thereby a complete filler opening extending from the inner surface of wall 12 to the outer surface 104 of block 106 is created. It will be noted that the periphery of the opening 100 formed by the flange 102 cooperates with the hole 116 and weld seam 114 to form a filler opening having a substantially smooth continuous annular wall from end to end thereof. The filler opening is flared outwardly as illustrated in Figs. 4 and 5 and a bung or plug (not here shown) may be introduced with effectiveness to hold the contents of the barrel therein.

The form of the invention shown in Figs. 6 and 7 is but slightly different from the structure illustrated in Figs. 4 and 5 and the principle involved with respect to establishing a strong filler opening structure is the same as that above set down. Some saving in manufacture may be effected by eliminating the flange from barrel wall 12 and where such is desired, the block 200 is made as shown to have a hole 202 in register with opening 204 in wall 12 of the barrel. The combined lengths of these elements 202 and 204 establish the filler opening and when this flangeless tip of filler opening is to be produced, the edge of wall 12 forming opening 204 is inclined as at 206 to cooperate with an angled margin 208 at the meeting edge between the lower face of block 200 and the face thereof which forms the hole 202 therethrough. When block 200 is in position, its lower surface is directly against the outer surface of wall 12 and a weld seam 210 fills the groove provided by the presence and opposed relation of inclined faces 206 and 208. Thus, the block hole 202 cooperates with wall opening 204 and weld seam 210 to form a filler opening having a substantially smooth continuous annular wall from end to end thereof.

A weld seam 212 is provided at the outer periphery of block 200 to cooperate with weld seam 210 in holding the block in place and when a bung plug is driven into the filler opening, the strain that would otherwise be exerted upon the relatively soft material from which wall 12 is produced, is absorbed by block 200.

Because a number of forms of the invention have been illustrated and described, it will be obvious to one skilled in the art that additional deviations from precise structure shown, may be made without departing from the spirit of the invention or scope of the appended claims.

Having thus described the invention, what is claimed as new and desired to be secured by Letters Patent is:

1. In a barrel of the kind described, a hollow body provided with an opening in the side thereof; a relatively thick, strong reinforcing block positioned against and secured along the outside of the barrel body and having its inner face contoured to fit snugly against said barrel body around said opening therein, said block having a hole therethrough in register with the opening in the barrel body to combine therewith in forming a filler opening; and a weld seam completely circumscribing the filler opening, forming a part thereof and securing together the barrel body and the block at their zone of juncture within the filler opening, said weld seam being at the innermost face of the block and at the outer face of the barrel body, and being spaced inwardly in its entirety from both ends of the filler opening, said body opening, block opening and weld forming a filler opening having a substantially smooth continuous substantially annular wall from end to end thereof.

2. In a barrel of the kind described, a hollow body provided with an opening in the side thereof; a relatively thick, strong reinforcing block having a hole therethrough in register with the opening in the barrel body to combine therewith in forming a filler opening; and a weld seam completely circumscribing the filler opening, forming a part thereof and securing together the barrel body and the block at their zone of juncture within the filler opening, said barrel body having an out-turned flange around the opening in the side thereof, extending only a portion of the distance through the hole in the block, whereby the end of the flange is wholly below the outer face of the block, said weld seam being at the outer edge of the said flange and also spaced wholly below the outer face of the block, the inner periphery of said flange, block opening and weld forming a filler opening having a substantially smooth continuous substantially annular wall from end to end thereof.

3. In a barrel of the kind described, a hollow body provided with an opening in the side thereof; a relatively thick, strong reinforcing block having a hole therethrough in register with the opening in the barrel body to combine therewith in forming a filler opening; and a weld seam completely circumscribing the filler opening, forming a part thereof and securing together the barrel body and the block at their zone of juncture within the filler opening, said barrel body having an out-turned flange around the opening in the side thereof, extending a portion of the distance through the hole in the block, said weld seam being at the outer edge of the said flange, and intermediate the outer and inner faces of the block, said block being offset to present a lip spaced outwardly from and overhanging said flange, the said weld seam being within the space between the overhanging lip and the outer edge of the flange.

ERNEST H. BENSON.

REFERENCES CITED

The following references are of record in the file of this patent:

UNITED STATES PATENTS

| Number | Name | Date |
|---|---|---|
| 968,258 | Parkinson | Aug. 23, 1910 |
| 1,792,928 | Reigart | Feb. 17, 1931 |
| 1,992,960 | Miller et al. | Mar. 5, 1935 |